United States Patent [19]
White

[11] Patent Number: 4,725,019
[45] Date of Patent: Feb. 16, 1988

[54] AIRCRAFT ENGINE MOUNT WITH VERTICAL VIBRATION ISOLATION

[75] Inventor: John L. White, Bellevue, Wash.

[73] Assignee: The Boeing Company, Seattle, Wash.

[21] Appl. No.: 895,127

[22] Filed: Aug. 11, 1986

[51] Int. Cl.$^4$ .............................................. B64D 27/00
[52] U.S. Cl. ........................................ 244/54; 248/557
[58] Field of Search ................. 244/54; 248/554, 557; 267/158, 160

[56] References Cited

U.S. PATENT DOCUMENTS

| | | | |
|---|---|---|---|
| 1,815,442 | 7/1931 | Masury . | |
| 1,860,444 | 5/1932 | Woolson . | |
| 2,028,549 | 1/1936 | Lord | 248/7 |
| 2,523,504 | 9/1950 | Ford, Jr. | 248/5 |
| 2,715,508 | 8/1955 | Small, Jr. | 248/5 |
| 2,722,391 | 11/1955 | Krieghoff | 248/5 |
| 2,724,948 | 11/1955 | Hiscock et al. | 60/39.31 |
| 3,288,404 | 11/1966 | Schmidt et al. | 248/5 |
| 3,318,554 | 5/1967 | Ward et al. | 244/54 |
| 3,836,100 | 9/1974 | Von Hardenberg et al. | 244/54 |
| 3,844,115 | 10/1974 | Freid | 60/39.31 |
| 4,013,246 | 3/1977 | Nightingale | 244/54 |
| 4,097,011 | 6/1978 | White | 248/5 |
| 4,111,386 | 9/1978 | Kenigsberg et al. | 244/17.27 |

FOREIGN PATENT DOCUMENTS

91846  3/1938  Sweden ................................. 244/54

Primary Examiner—Joseph F. Peters, Jr.
Assistant Examiner—Rodney Corl
Attorney, Agent, or Firm—Joan H. Pauly

[57] ABSTRACT

A pair of upper isolators (30) are vertically aligned with a pair of lower isolators (30). The isolators (30) in each pair are spaced horizontally. Each isolator (30) connects and extends between a rear mount bulkhead (16) that is part of a strut (10) and an auxiliary bulkhead (18) that is attached to the aircraft engine (6). The isolators (30) are flexible in a vertical direction to isolate vertical vibrations and are stiff in a lateral direction to resist side loads and engine roll torque. Instead of pairs of isolators (30), a single upper isolator (30b) and a single lower isolator (30b) may be provided. Longitudinally spaced isolators (30) may be formed by stacks (32) of metal plates that bend under vertical loads and resist side loads and torque in shear. Laterally spaced isolators (30e, 30e') resist side loads and torque in tension/compression and isolate vertical loads by bending or in shear. The stacked metal plates of an upper isolator (30d) and an aligned lower isolater (30d) may be formed by wall portions of nested rectangular tubes (52d, 54d).

17 Claims, 24 Drawing Figures

AIRCRAFT ENGINE MOUNT WITH VERTICAL VIBRATION ISOLATION

TECHNICAL FIELD

This invention relates to aircraft engine mount systems and, more particularly, to such a system which includes vertically spaced upper and lower isolators that are flexible vertically to isolate vertical vibrations and that are stiff laterally to resist lateral loads and roll torque.

BACKGROUND ART

In modern commercial passenger aircraft, a problem that is being encountered is interior cabin noise caused by engine vibrations transmitted through the airframe structure. For example, vibrations of a wing-mounted engine may be transmitted by the engine mounts, strut, wing, and fuselage. The problem of cabin noise is particularly troublesome in some of the more recent aircraft which have propulsion systems closely coupled to the wing through a very stiff mount, nacelle, and strut structure.

Some engine installations react roll torque at the front mount. This arrangement permits vertical and lateral vibrations to be isolated independently at the rear mount without affecting the roll stiffness of the mount installation. However, in wing mounted engines it is generally advantageous to react roll torque at the rear mount rather than at the front mount. Modern engines possess high torsional stiffness and strength, and when roll torque is reacted at the rear mount, the engine rather than the strut will transmit torque rearwards. This reduces the load carrying requirements of the strut and thereby permits weight savings in the strut. In addition, rear mount torque reaction will generally permit the strut width to be narrower to decrease drag and enhance the aerodynamic performance of the aircraft. A problem that is encountered in providing vibration isolation in a rear mount that reacts roll torque is the need to maintain rigidity in the lateral and roll directions in order to prevent redistribution of lateral loads and roll torque to the front mount and thrust reverser hinges. Known isolation systems generally reduce the torsional stiffness of the rear mount and thereby permit such undesirable redistribution of loads.

There are a number of approaches which may be taken to solving the problem of interior cabin noise caused by engine vibrations. One such approach would be to reduce engine unbalance levels. Since the problem of cabin noise can occur even though the engines have normal levels of unbalance within engine specification limits, the approach of reducing engine unbalance levels would be very time consuming and expensive to carry out. To be effective, the engine balancing would have to be done with the engine installed on the wing because vibration response is different in an installed engine than on an engine test stand. Normal levels of rotor unbalance are very small and are caused by a number of factors that vary randomly. Particular combinations of these variables will cause an unacceptable level of cabin noise. The readjustment of the variables that are related to cabin noise is a trial and error process which would be very expensive for new engines and highly, if not completely, impractical for engines being overhauled in maintenance shops.

Another possible approach would be to use tuned mass vibration absorbers to reduce cabin noise. Mass vibration absorbers have been used successfully in limited situations in which the vibrations to be reduced were over a very narrow frequency range. However, a number of problems arise in the use of mass vibration absorbers. These problems include the tendency of the absorbers to drift from their tuned frequencies, fatigue failures of the absorbers, and the relatively high weight of absorbers that reduce vibrations at low frequency levels in the range of about 0 to about 60 hertz.

A third and more conventional approach to solving the problem of cabin noise is to provide vibration isolators at the engine mounts. Problems that are associated with the use of known engine mount isolators include the undesired reduction in torsional stiffness and redistribution of side loads and torque discussed above, space limitations in the engine mount area, and limitations on the isolator configuration and/or material because of the high temperature environment in the engine mount area. The use of compressed woven wire isolation material instead of elastomeric materials has been proposed for use in high temperature environments. The proposed isolator designs using such metal materials have a number of drawbacks. The designs generally are unacceptable for installations in which roll torque is reacted at the rear mount because they reduce the rear mount lateral load and torsional stiffness to an unacceptable degree and thereby permit excessive redistribution of side loads and roll torque into the forward mount and thrust reverser hinges. Metal mesh isolators also provide relatively unpredictable isolation because of their high degree of nonlinear behavior. In addition, the ability of such isolators to provide sufficient damping to function adequately in a system resonant mode and to isolate the low frequency vibrations associated with cabin rumble noise is questionable.

The patent literature includes numerous examples of aircraft engine mount systems. Wing engine mount systems without vibration isolation are disclosed in U.S. Pat. No. 3,318,554, granted May 9, 1967, to P. A. Ward et al.; No. 3,844,115, granted Oct. 29, 1974, to W. B. Freid; and No. 4,013,246, granted Mar. 22, 1977, to D. J. Nightingale. Aircraft engine mount systems with vibration isolation are disclosed in U.S. Pat. No. 1,815,442, granted July 21, 1931, to A. F. Masury; No. 1,860,444, granted May 31, 1932, to L. M. Woolson; No. 2,523,504, granted Sept. 26, 1950, to F. A. Ford, Jr.; No. 2,715,508, granted Aug. 16, 1955, to L. C. Small, Jr.; No. 2,722,391, granted Nov. 1, 1955, to R. T. Krieghoff; No. 2,724,948, granted Nov. 29, 1955, to G. H. Hiscock et al.; No. 3,288,404, granted Nov. 29, 1966, to W. E. Schmidt et al.; No. 3,836,100, graned Sept. 17, 1974, to P. W. Von Hardenberg et al.; No. 4,097,011, granted June 27, 1978, to R. F. White; and No. 4,111,386, granted Sept. 5, 1978, to I. J. Kenigsberg et al. Krieghoff, Hiscock et al., Schmidt et al., and Kenigsberg et al. disclose isolators that have stacks of alternating metal plates and elastomeric layers. Von Hardenberg et al. disclose an engine mount for a helicopter that is designed to isolate the engine from lateral input motions imparted by the airframe by uncoupling engine roll response. There are separate laterally offset upper and lower rear mounts. The isolator in the lower mount provides a minimum lateral restraint and elastic vertical restraint of the engine, and the isolator of the upper mount provides a minimum vertical restraint and elastic lateral restraint of the engine.

U.S. Pat. No. 2,028,549, granted Jan. 21, 1936, to H. C. Lord, discloses an automobile engine mounting system in which the engine is suspended from front and rear U-shaped frames. At each U-shaped frame, two links connect the engine to the corners of the frame. The joints between the links and the frame members and the joints between the links and the engine have elastomeric bushings to absorb vibrations and torque impulses. The links are oriented at about 45 degrees and swing to accommodate rocking of the engine due to engine torque impulse. The rubber bushings around the joints distort to accommodate the motion.

The above patents and the prior art that is discussed and/or cited therein should be studied for the purpose of putting the present invention into proper perspective relative to the prior art.

DISCLOSURE OF THE INVENTION

The subject of the invention is a system for mounting an engine on an engine support structure in an aircraft and for isolating engine vibrations in a preferred direction. According to an aspect of the invention, the system comprises an engine mount structure attached to the engine, upper isolator means, and lower isolator means. Each of the isolator means has a first end portion attached to the support structure and a second end portion attached to the mount structure to connect the support structure and the mount structure to each other. Each isolator means is flexible in a vertical direction to allow relative vertical movement between the engine and the support structure and to isolate engine vibrations in a vertical direction. Each isolator means is stiff in a lateral direction and the upper isolator means is spaced vertically from the lower isolator means, to resist relative lateral movement between the engine and the support structure and to resist engine roll torque.

Systems constructed according to the invention alleviate the problem of unacceptable levels of cabin noise caused by engine vibrations without sacrificing the stiffness of the mount system in directions other than the preferred direction of vibration isolation. This is particularly advantageous when the system is used in the rear mount of an engine installation in which engine roll torque is reacted at the rear mount rather than the front mount. The ability of the isolators of the invention to isolate vertical vibrations while resisting lateral loads and engine roll torque prevents lateral load reactions and roll torque reactions from redistributing to the front engine mount. In addition, the structure of the isolator means of the invention prevents side loads and torque from being undesirably transferred to hinge structures associated with the engine and its mount system. The system of the invention is also highly versatile and can be readily adapted to a variety of types of engine installations with varying space limitations, load requirements, and heat environments. The system of the invention provides effective, reliable, predictable isolation of engine vibrations. In addition, the system of the invention is relatively simple in construction, inexpensive to manufacture and maintain, and lightweight.

The versatility of the system of the invention allows the orientation of the isolators and the manner in which they resist loads to be varied without sacrificing the advantages of the system. In some of the preferred embodiments of the invention, each isolator means comprises metal plate means extending between the support structure and the mount structure essentially parallel to the longitudinal axis of the aircraft. The metal plate means has opposite laterally extending edges secured to the support structure and the mount structure, respectively. In general, the metal plate means preferably comprises a plurality of horizontal metal plates stacked vertically. When the installation requires damping of vibrations, each isolator means preferably further comprises elastomeric material positioned between the stacked metal plates. The stack of metal plates may be attached to the support structure and the mount structure in a number of ways. For example, the isolator means may include opposite pairs of laterally extending L-shaped mounting members for attaching the metal plates to each other and to the structures.

Another preferred configuration of the isolator means is one that includes an isolator that has opposite ends secured to the support structure and the mount structure, respectively, and that extends laterally between the opposite ends, to resist lateral loads and engine roll torque in tension and compression. This configuration has the advantage of providing more side load and torsional stiffness for the same volume of material because the stress modulus in tension and compression is higher, approximately three times as high, than the shear modulus. In this configuration, as well as in configurations in which the laterally extending edges of the isolators are secured to the structures, it is generally preferable for each of the upper and lower isolator means to include a pair of horizontally spaced isolators, with the isolators of the upper isolator means being vertically aligned with the isolators of the lower isolator means. This paired configuration helps to maximize the load carrying and space saving efficiency of the system.

The advantages and features of the invention discussed above and other advantages and features will become apparent from the detailed description of the best modes for carrying out the invention that follows.

BRIEF DESCRIPTION OF THE DRAWINGS

In the drawings, like element designations refer to like parts throughout, and.

BEST MODES FOR CARRYING OUT THE INVENTION

Figure 1:
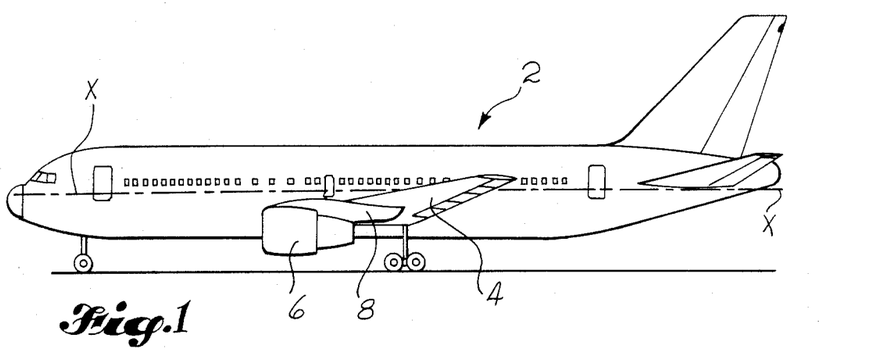
FIG. 1 is a side elevational view of a type of aircraft in which the system of the invention may be used.
Figure 2:
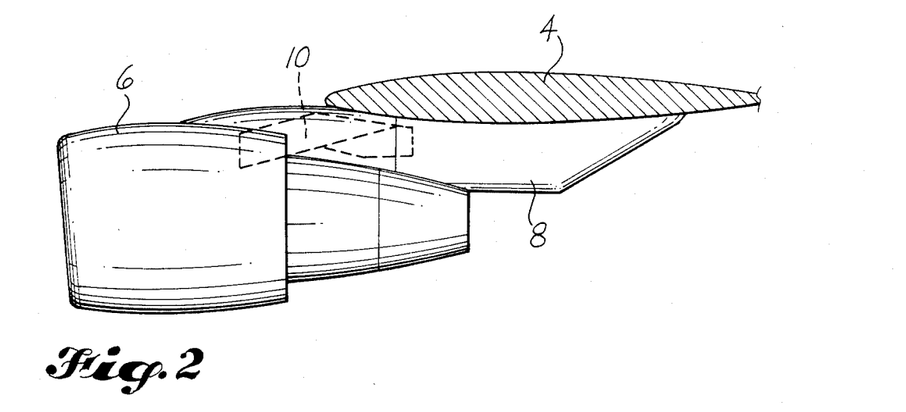
FIG. 2 is an elevational view of the engine, engine mount, and wing shown in FIG. 1, with the wing shown in section.
Figure 3:
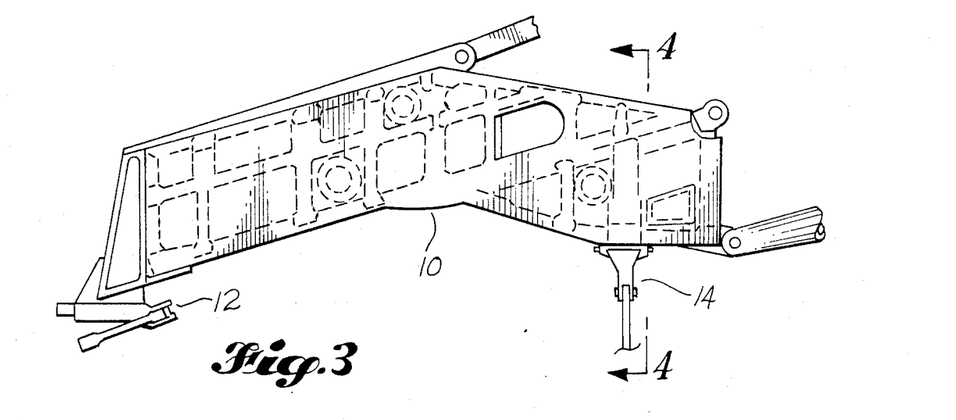
FIG. 3 is an elevational view of the strut support structure shown in phantom in FIG. 2.
Figure 10:
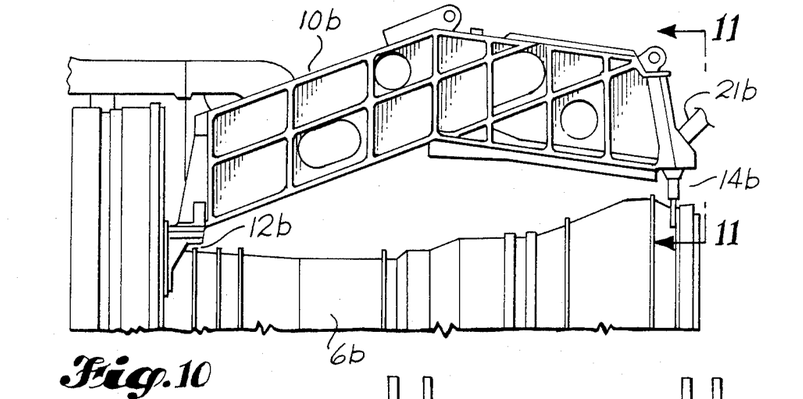
FIG. 10 is like FIG. 3 except that a part of the engine is also shown and the strut rear mount bulkhead is the aftmost bulkhead.

The drawings show apparatus that is constructed according to the invention and that also constitutes the best modes of the invention currently known to the applicant. FIG. 1 shows an aircraft 2, FIGS. 2, 3, and 10 show strut and front and rear mount configurations, and FIGS. 4, 7, 11 and 16 show lower mount fittings 20, 20a, 20b, 20d. The aircraft structures and mount configurations shown in these Figs. are shown and described herein for the purpose of illustrating a type of aircraft and types of mount configurations into which the apparatus of the invention may be incorporated to advantage, and types of mount fittings with which the apparatus of the invention may be used to advantage. It is intended to be understood that the system of the invention may also be used advantageously in other types of aircraft and in other types of mount configurations and in connection with other types of mount fittings without departing from the spirit and scope of the invention.

Six preferred embodiments of the invention are shown and described herein. These embodiments are shown in FIGS. 4-6B, 7-9, 10-13, 14 and 15, 16-18, and 19-22, respectively. The reference characters associated with the first embodiment shown in FIGS. 4-6B do not include any letter designation. The reference characters associated with the other five embodiments include letter designations a-e, respectively. Corresponding elements in the various embodiments are designated by reference characters having like numeral portions.

FIG. 1 illustrates a commercial passenger aircraft 2 of a type having wings 4 on which engines 6 are mounted. A fairing 8 is provided over the mounting structure in a known manner. The reference character X indicates the longitudinal axis of the aircraft 2. FIG. 2 is an enlarged view of the wing 4, engine 6, and fairing 8 shown in FIG. 1. The strut structure 10 that provides the support structure for the engine 6 is shown in phantom in FIG. 2. FIG. 3 is an enlarged elevational view of the strut 10 shown in FIG. 2 with the fairing 8 removed to show the details of the strut structure. A front mount 12 and a rear mount 14 attach front and rear portions, respectively, of the engine 6 to the strut 10.

Figures 4, 5, 6, 6A:
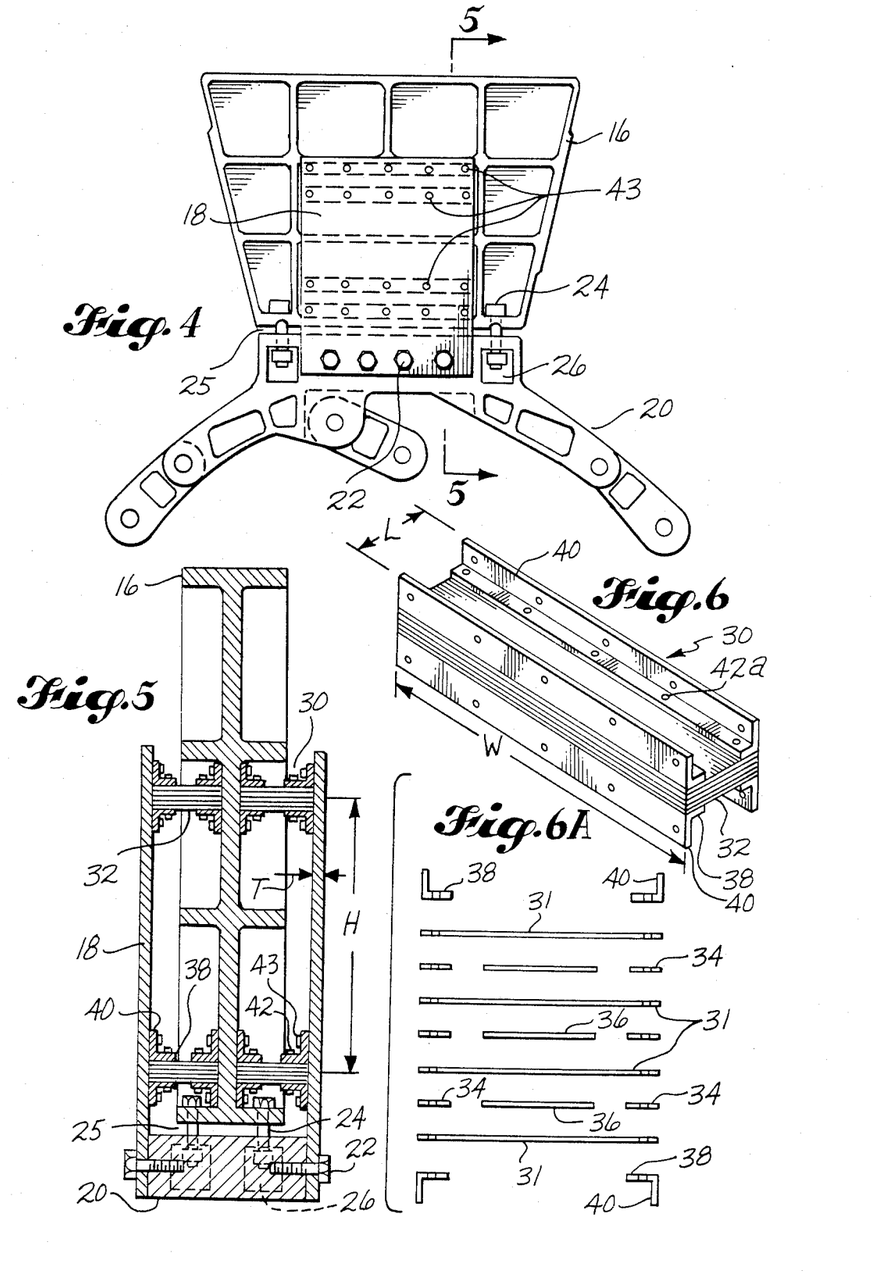
FIG. 4 is a rear elevational view of the rear engine mount shown in FIG. 3, taken along the line 4—4 in FIG. 3 and showing a first preferred embodiment of the mounting and isolating system of the invention.
FIG. 5 is a sectional view taken along the line 5—5 in FIG. 4.
FIG. 6 is a pictorial view of one of the isolators shown in FIG. 5.
FIG. 6A is an exploded side view of the isolator shown in FIG. 6.

FIGS. 4-6B show the first preferred embodiment of the system of the invention. FIG. 4 illustrates a lower mount fitting 20 of a type with which the first embodiment and other embodiments of the invention may be used to advantage. The fitting 20 reacts vertical, lateral, and torque loads while permitting engine radial thermal expansion. Fore and aft free thermal expansion of the engine is permitted by incorporating antifriction spherical bearings in the fitting 20 to hinge the engine in the fore and aft direction. As noted above, the system of the invention is particularly advantageous with lower fittings of this type since it provides vibration isolation without affecting roll stiffness so that lateral loads and roll torque are prevented from transferring to the front mount.

The first embodiment shown in FIGS. 4-6B includes an engine mount structure or auxiliary bulkhead 18 that is rigidly attached to the lower fitting 20 by bolts 22. The bulkhead 18 is attached to the engine (not shown) by means of the lower fitting 20. This embodiment also includes four isolators 30, each of which is attached to the auxiliary bulkhead 18 and to a rear mount bulkhead 16 to connect the bulkheads 16, 18 to each other. The bulkhead 16 is a part of the strut support structure 10 shown in FIG. 3 and is positioned near the aft end of the strut structure 10.

A feature of the invention is the provision of a dual load path between the engine support structure (the strut 10) and the engine. One load path extends from the rear mount bulkhead 16, through the isolators 30, auxiliary bulkhead 18, and lower mount fitting 20, to the engine. The isolators 30 in this load path isolate vertical vibrations and function during normal loads in cruise and other steady flight conditions. The other load path is provided by a direct connection between the rear mount bulkhead 16 and the lower mount fitting 20. The bulkhead 16 is attached to the fitting 20 by means of bolts 24. The bolts 24 are slidable relative to the lower mount fitting 20, and a gap 25 between the bulkhead 16 and the fitting 20 and clearances 26 in the fitting 20 for the lower ends of the bolts 24 are provided. This arrangement of bolts 24, gap 25, and clearances 26 functions in a known manner to allow relative movement between the fitting 20 and the bulkhead 16 during steady flight conditions and to prevent excessive relative motion under extraordinary loads. In combination with the system of the invention, the arrangement permits the isolators 30 to function during steady flight conditions and provides stiffness and strength under high maneuver loads. In addition, the arrangement provides fail-safety in the event of a failure in the first load path, such as isolator fatigue failure.

In the preferred embodiment shown in FIGS. 4-6B, there are four isolators 30, including a pair of longitudinally spaced upper isolators 30 and a pair of longitudinally spaced lower isolators 30. The upper isolators 30 are vertically aligned with the lower isolators 30. Each isolator 30 includes a vertical stack 32 of horizontal metal plates 31. The plates 31 are separated from each other by spacers 34 in order to allow them to move relative to each other without friction. This in turn allows them to act separately when they bend vertically to maintain the vertical flexibility of the isolator 30. A lubricant could also be used to prevent friction. When damping of the vertical vibrations is desired, elastomeric material 36 is preferably positioned between and bonded to the plates 31 to damp the vibrations. The elastomeric material 36 also helps to stabilize the metal plates 31. Since the elastomeric material 36 adds very little stiffness, the damping may be varied independently of the isolating spring rate.

The stack 32 of plates 31 extends between the rear mount bulkhead 16 and the auxiliary bulkhead 18 essentially parallel to the longitudinal axis X of the aircraft. The stack 32 has opposite laterally extending edges secured to the bulkheads 16, 18. In the preferred embodiment shown in FIGS. 4-6B, each isolator 30 includes two pairs of laterally extending mounting members 38, 40. Each mounting member 38, 40 has an L-shaped cross section formed by a horizontal flange 38 and a vertical flange 40. The laterally extending edges of the stack 32 are each positioned between the horizontal flanges 38 of a pair of mounting members 38, 40. Bolts 42 secure the plates 31 of the stack 32 to each other and to the flanges 38. The flanges 40 extend vertically away from the stack 32 and are attached to the bulkheads 16, 18 by means of bolts 43.

The metal plates 31 of each isolator 30 are flexible in a vertical direction along their longitudinal length L, to allow relative vertical movement between the engine and the strut and to isolate engine vibrations in a vertical direction. The isolator plates 31 offer low resistance to vertical motion because of their relatively thin bending sections. However, because of their relatively long lateral width W and their relatively short longitudinal span L, the plates 31 provide high resistance to side loads. The combination of the stiffness in a lateral direction and the vertical spacing H of the upper and lower isolators 30 provides high torsional stiffness to resist engine roll torque. Vertical loads are taken up and isolated in bending of the metal plates 31, and lateral loads and roll torque are resisted in shear of the plates 31. The effective thickness T of the auxiliary bulkhead 18 is dimensioned to provide sufficient in-plane shear rigidity of the bulkhead 18 to maintain the high torsional rigidity. The dimensions W, L, H, T may be varied to meet the particular load requirements and space limitations of a particular installation.

Figures 6B, 7, 8, 9:
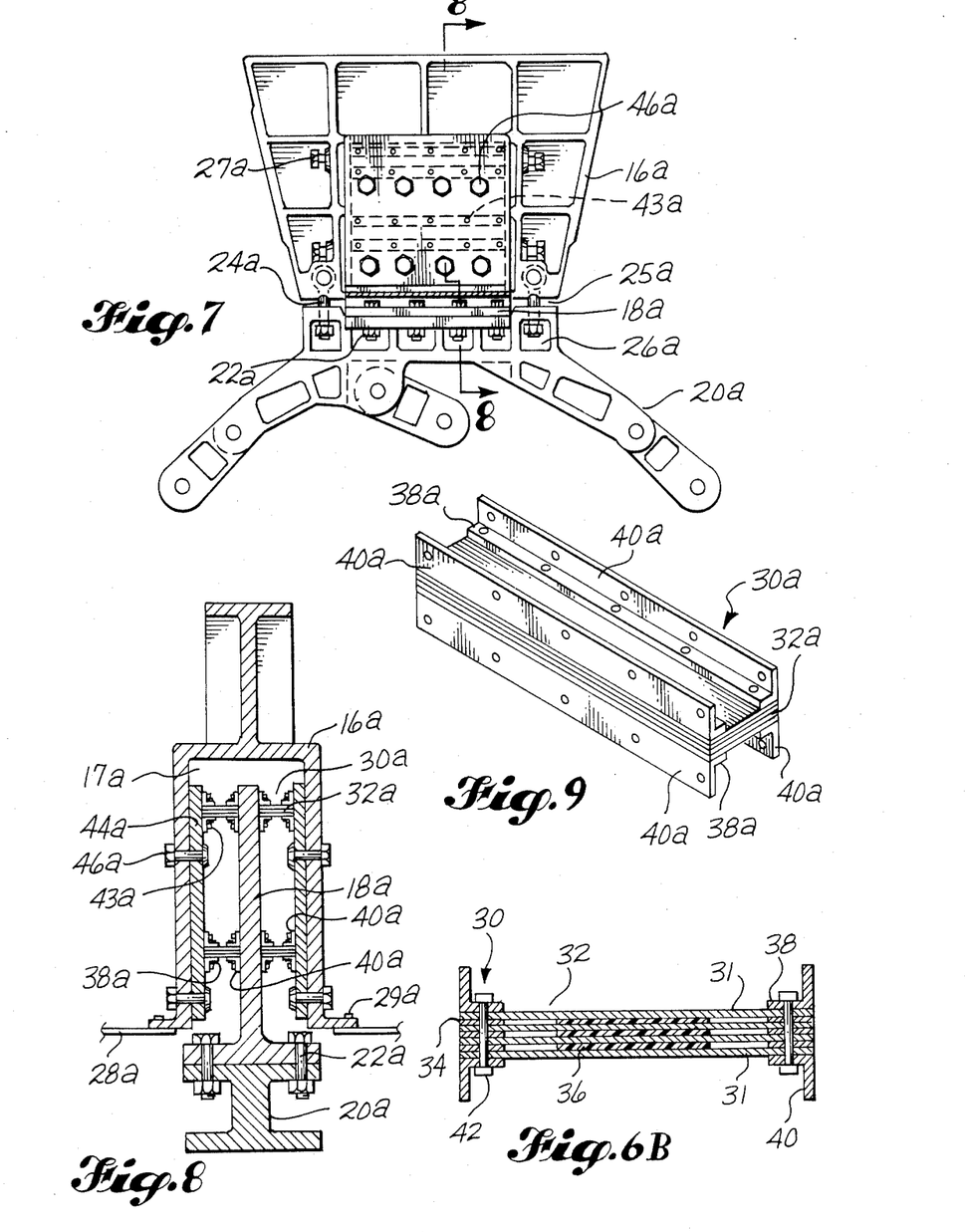
FIG. 6B is a vertical sectional view of the isolator shown in FIG. 6.
FIG. 7 is like FIG. 4 except that it shows a second preferred embodiment of the system.
FIG. 8 is a sectional view taken along the line 8—8 in FIG. 7.
FIG. 9 is a pictorial view of one of the isolators shown in FIG. 8.

FIGS. 7-9 show a second preferred embodiment of the system of the invention. As in the first embodiment, the system shown in FIGS. 7-9 includes an auxiliary bulkhead 18a that is rigidly attached to a lower mount fitting 20a by bolts 22a. The fitting 20a is also attached to the rear mount bulkhead 16a of the strut by bolts 24a. This connection is provided with a gap 25a and clearances 26a to allow relative motion as described above.

The four isolators 30a of the second embodiment are constructed and positioned in the same manner as the isolators 30 of the first embodiment. Each isolator 30a comprises a stack 32a of metal plates and four L-shaped mounting members 38a, 40a. The vertical flanges 40a of the mounting members 38a, 40a are secured to the rear mount bulkhead 16a and the auxiliary bulkhead 18a by bolts 43a. In this embodiment, the rear mount bulkhead 16a is provided with reinforcing members 44a that are secured to the main bulkhead structure by bolts 46a. The isolators 30a are attached to the reinforcing members 44a to attach them to the bulkhead 16a.

The main difference between the first and second embodiments is that, in the first embodiment, the rear mount bulkhead 16 extends downwardly into the auxiliary bulkhead 18, whereas in the second embodiment, the rear mount bulkhead 16a is provided with a pocket 17a which receives the auxiliary bulkhead 18a and isolators 30a. In the second embodiment, the lower ends of the bulkhead 16a are preferably attached to the strut bottom skin 28a by suitable fasteners 29a. This attachment has the advantage of facilitating shear flow continuity through the strut bottom skins. Another advantage of the second preferred embodiment shown in FIGS. 7-9 is its inherent modularity. The isolators 30a and the auxiliary bulkhead 18a may be handled as a unit and may be easily inserted and removed from the pocket 17a for installation and/or adjustment. Damping may be provided as discussed above relative to FIGS. 4-6B, or by other means such as positioning elastomeric material above the upper isolators 30a.

FIG. 7 also illustrates an additional feature of an adjustable stop 27a for controlling the extent of lateral and torsional motion. This feature may be incorporated in any of the preferred embodiments of the invention.

FIGS. 10-13 show a third preferred embodiment of the system of the invention. In this embodiment there are two, rather than four, isolators 30b, including an upper isolator 30b and a lower isolator 30b which are generally aligned vertically. This embodiment of the system of the invention is particularly well adapted to the type of mounting installation shown in FIGS. 10 and 11 in which the rear mount bulkhead 16b is the aftmost bulkhead of the strut support structure 10b. Like the installation shown in FIG. 3, the installation shown in FIG. 10 includes a front mount 12b and a rear mount 14b. The two isolators 30b are attached directly to the existing aftmost bulkhead 16b which forms the rear enclosure of the strut torque box. This arrangement avoids penetration of the strut torque box. An opening 19b is provided in the auxiliary bulkhead 18b to allow attachment of the strut diagonal brace 21b to the bulkhead 16b. The auxiliary bulkhead 18b includes two webs 23b which function as stiffeners. An advantage of the third preferred embodiment is that it adapts the system of the invention to the type of installation shown in FIG. 10 and allows the system of the invention to be retrofitted into such an installation.

Figures 11, 12, 13:
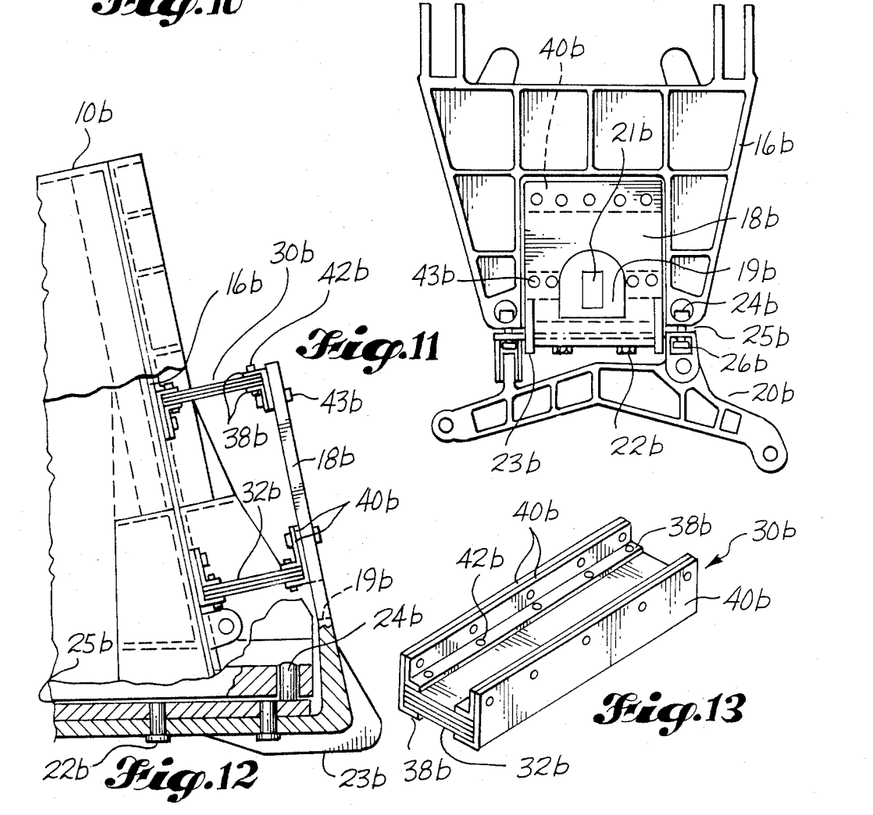
FIG. 11 is a rear elevational view taken along the line 11—11 in FIG. 10 and showing the preferred embodiment of the system for use with the type of mount system shown in FIG. 10.
FIG. 12 is a side elevational view of the rear mount shown in FIG. 11, with foreground portions cut away to reveal the isolating means.
FIG. 13 is a pictorial view of one of the isolators shown in FIG. 12.

FIG. 11 illustrates a type of lower mount fitting 20b which is used with the type of installation shown in FIG. 10 and which is compatible with the third preferred embodiment of the invention. The fitting 20b has a lower portion which is attached to the engine 6b by antifriction spherical bearings, and an upper portion which is pivotably attached to the lower portion. These attachments allow free thermal expansion of the engine 6b. The auxiliary bulkhead 18b is secured to the upper portion of the fitting 20b by bolts 22b. The upper portion of the fitting 20b is also attached to the rear mount bulkhead 16b by bolts 24b. As in the first two embodiments, this connection is provided with a gap 25b and clearances 26b to allow limited relative movement between the fitting 20b and the bulkhead 16b.

Referring to FIGS. 12 and 13, each isolator 30b comprises a stack of plates 32b and four L-shaped mounting members 38b, 40b. The vertical flanges 40b of the mounting members 38b, 40b are attached to the bulkheads 16b, 18b by bolts 43b. Bolts 42b attach the plates in the stack 32b to each other and to the horizontal flanges 38b of the mounting members 38b, 40b. FIG. 13 is a pictorial view of the lower isolator 30b. In each pair of mounting members 38b, 40b, the vertical flanges 40b of both the upper member 38b, 40b and the lower member 38b, 40b extend upwardly. The flange 40b of the lower member 38b, 40b abuts the lateral edges of the plates in the stack 32b and the outwardly facing lateral face of the vertical flange 40b of the upper member 38b, 40b. Thus, each bolt 43b extends through an upper vertical flange 40b and a lower vertical flange 40b. The upper isolator 30b is constructed in a similar manner except that the vertical flanges 40b project downwardly and the upper and lower mounting members 38b, 40b are reversed.

Figure 14:
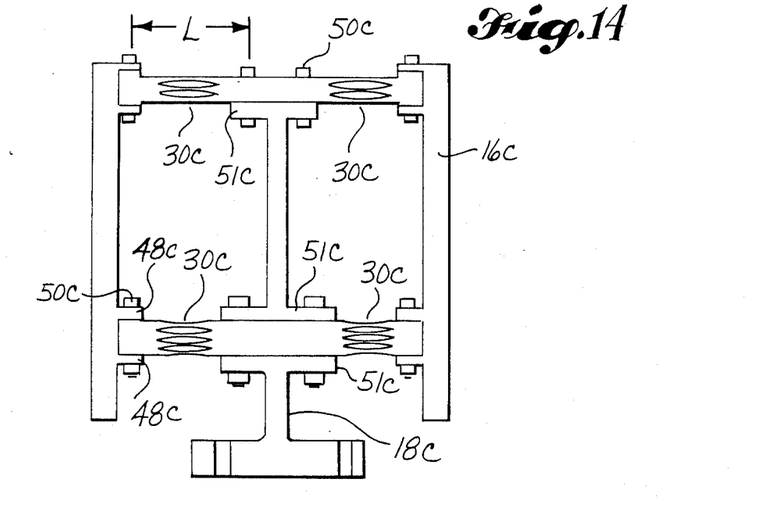
FIG. 14 is a schematic side elevational view of another preferred embodiment of the system.
Figure 15:
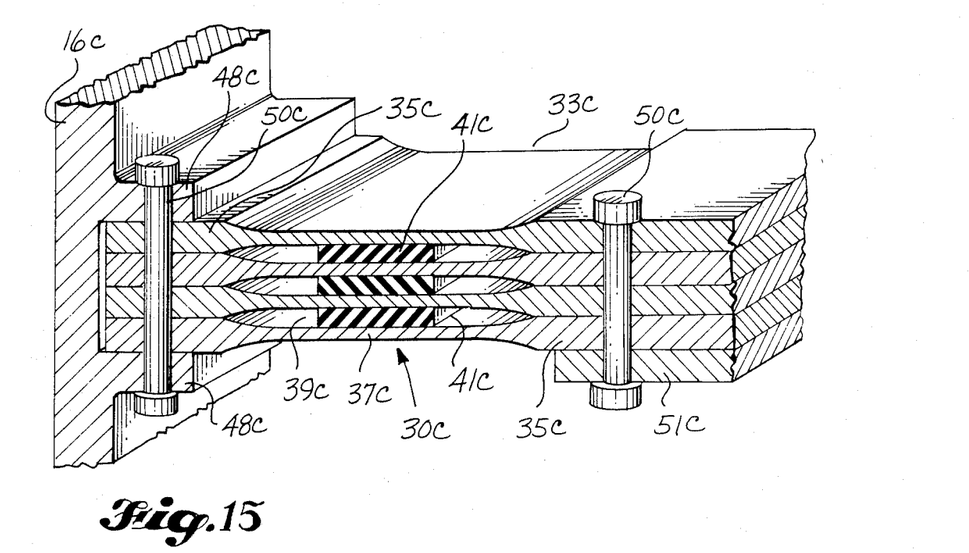
FIG. 15 is a fragmentary pictorial view of one of the isolators and the surrounding structure shown in FIG. 14, with parts shown in section.

A fourth preferred embodiment of the invention is shown schematically in FIGS. 14 and 15. This embodiment includes four isolators 30c positioned in the same manner as the isolators 30, 30a of the first and second embodiments to connect a rear mount bulkhead 16c and an auxiliary bulkhead 18c. Each pair of isolators 30c is manufactured and installed as a unit. FIG. 15 is an enlarged fragmentary view of the upper pair of isolators 30c. The isolators 30c are formed by metal plates 33c and bonded elastomeric layers 41c. The plates 33c extend longitudinally between opposite walls of the rear mount bulkhead 16c and through the auxiliary bulkhead 18c that is received between the walls of the bulkhead 16c. The opposite end portions of the plates 33c that are secured to the rear mount bulkhead 16c and the center portions of the plates 33c that are secured to the auxiliary bulkhead 18c abut each other and are bonded together along their horizontal faces. Each plate 33c has a reduced thickness portion 37c between each of its ends and its center portion. The reduced thickness portions 37c provide gaps 39c between the plates 33c for receiving the layers 41c of elastomeric material for damping vertical vibrations. This arrangement provides a pair of isolators 30c, each of which has abutting opposite end portions 35c that are formed by the corresponding end portions of the plates 33c and part of the corresponding center portions of the plates 33c.

The rear mount bulkhead 16c is provided with longitudinally projecting, laterally extending mounting flanges 48c, and the auxiliary bulkhead 18c is provided with longitudinally projecting, laterally extending flanges 51c for receiving the end portions and center portions of the plates 33c, respectively, therebetween. Bolts 50c secure the plates 33c to the flanges 48c, 51c. The isolator configuration shown in FIGS. 14 and 15 has the advantages of being relatively easy and inexpensive to manufacture and of facilitating the maximizing of the longitudinal length L of each isolator 30c. As in the first three embodiments, the isolators 30c bend over the length L. The maximizing of the potential extent of the length L further increases the versatility and adaptability of the system of the invention.

Figure 16:
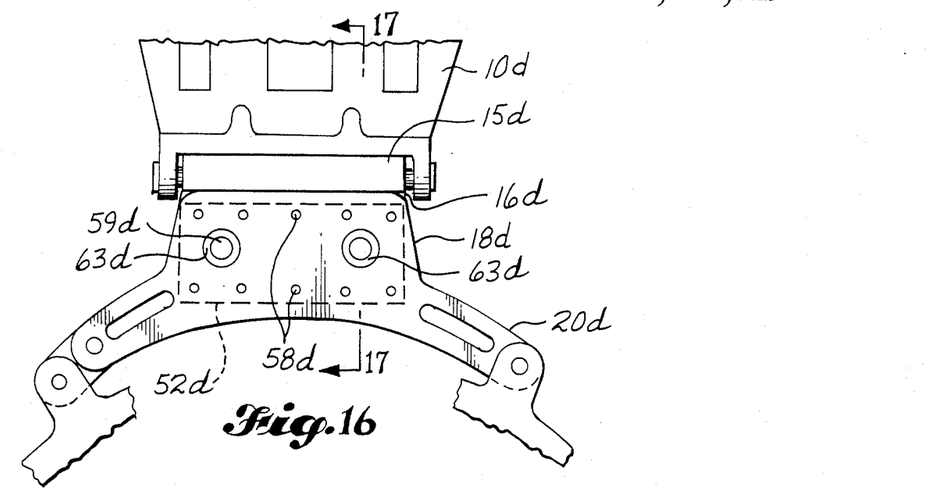
FIG. 16 is rear elevational view of still another preferred embodiment of the invention.
Figures 17, 18:
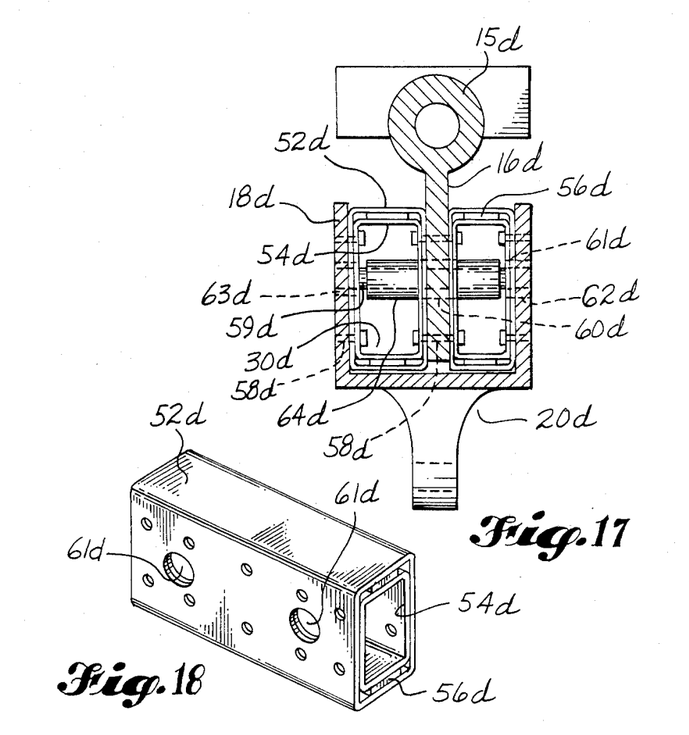
FIG. 17 is a sectional view taken along the line 17—17 in FIG. 16.
FIG. 18 is a pictorial view of one of the nested tube members shown in FIG. 17.

FIGS. 16-18 show a fifth preferred embodiment of the invention. Like the first, second, and fourth embodiments, this embodiment includes an upper pair of longitudinally spaced isolators 30d vertically spaced from and aligned with a lower pair of isolators 30d. Each of the four isolators 30d is attached to the rear mount bulkhead 16d and the auxiliary bulkhead 18d by bolts 58d. In this embodiment, the auxiliary bulkhead 18d is an integral part of the main yoke portion of the lower mount fitting 20d. The fitting 20d is pivotably attached to the engine to allow for radial expansion of the engine. The rear mount bulkhead 16d is pivotably attached to the main strut 10d by means of a cylindrical bushing 15d to pivot about a laterally extending axis to allow for longitudinal expansion of the engine.

Referring to FIGS. 17 and 18, the isolators 30d are formed by a pair of nested tubes 52d, 54d. In the preferred embodiment shown in FIGS. 17 and 18, each nested tube arrangement is generally rectangular and includes an outer tube 52d and an inner tube 54d. The upper and lower portions of each nested tube member form one of the upper isolators 30d and an aligned lower isolator 30d, respectively. The vertical sides of the tubes 52d, 54d extending between the isolators 30d form mounting flanges for the isolators 30d and add strength to the mounting system. As shown in FIGS. 17 and 18, the two tube walls forming each isolator 30d are preferably vertically spaced from each other to provide a gap therebetween. A body of elastomeric material 56d may be positioned in each of these gaps to damp vertical vibrations.

In the embodiment of FIGS. 16-18, vertical movement is limited and fail-safety is provided by a pair of pins 59d by means of which a secondary connection between the rear mount bulkhead 16d and the auxiliary bulkhead 18d is accomplished. Each pin 59d extends longitudinally through aligned holes 60d, 61d, 62d in the rear mount bulkhead 16d, the vertical sidewalls of the tubes 52d, 54d, and the auxiliary bulkhead 18d. Each of the holes 60d, 61d, 62d is dimensioned to provide a gap 63d between the inner wall of the hole 60d, 61d, 62d and the pin 59d. In the unstressed condition of the mounting system shown in FIG. 17, there is clearance both above and below the pin 59d to allow relative vertical motion between the bulkheads 16d, 18d during steady flight conditions. During high maneuver loads or upon failure of the isolators 30d, the pins 59d bottom out in the holes 60d, 61d, 62d to limit the relative vertical movement. Preferably, a two-piece sleeve 64d is welded onto the inner tubes 54d as shown in FIG. 17 to provide additional strength for limiting vertical motion.

FIGS. 19-22 show a sixth preferred embodiment of the system of the invention. Like the first, second, fourth, and fifth embodiments, this embodiment includes a pair of horizontally spaced upper isolators 30e vertically spaced from and aligned with a pair of lower isolators 30e. However, the isolators 30e are horizontally spaced in a lateral direction rather than in a longitudinal direction. This difference in orientation changes the torque and side load resisting feature from direct shear of isolator plates to direct normal force. In other words, in the sixth embodiment, torque and side loads are resisted in tension/compression of the isolator units 30e, and in the other embodiments, torque and side loads are resisted in shear of the plates of the isolator units 30, 30a, 30b, 30c, 30d. Since the stress modulus in tension and compression is generally larger than the shear modulus, the sixth embodiment provides more inherent side load and torsional stiffness for the same volume of material. The degree to which this modulus advantage may be realized in a particular installation depends on a number of factors, including the limitations on the longitudinal dimension of the isolators 30e, which may offset the modulus advantage.

Figure 19:
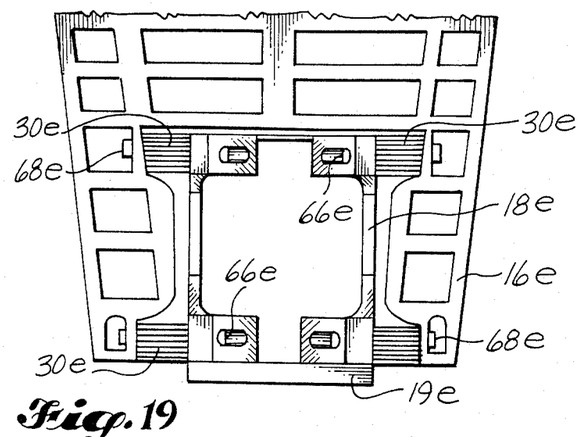
FIG. 19 is a schematic rear elevational view of another preferred embodiment of the invention.
Figure 20:
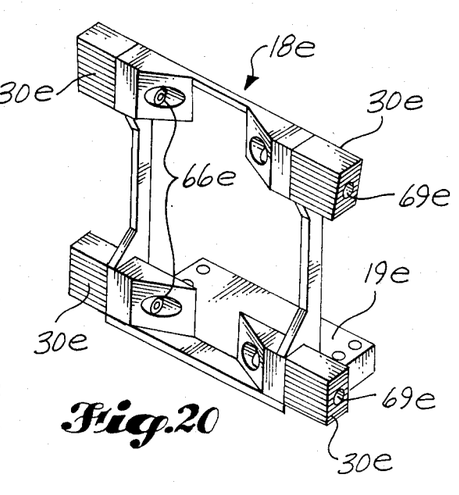
FIG. 20 is a pictorial view of the isolators and engine mount structure shown in FIG. 19.

Referring to FIGS. 19 and 20, each isolator 30e has a lateral end attached to the auxiliary bulkhead 18e by means of fasteners 66e. As shown in FIG. 19, the opposite end of each isolator 30e is secured to the rear mount bulkhead 16e by a fastener 68e. The isolator 30e extends laterally between the bulkheads 16e, 18e. As shown in FIGS. 19 and 20, in this embodiment the auxiliary bulkhead 18e may be provided with a mounting flange 19e for attaching the bulkhead 18e to a lower mount fitting (not shown).

Figure 21:
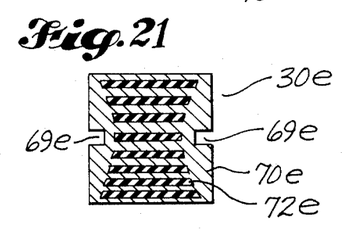
FIG. 21 is a sectional view of one of the isolators shown in FIG. 20.

FIG. 21 is a vertical sectional view of the type of isolator shown in FIGS. 19 and 20. The isolator 30e includes a metal body 70e that has a plurality of vertically spaced laterally and longitudinally extending cavities formed therein. These cavities may be filled with elastomeric material 72e if damping is desired. This results in the major laterally center portion of the isolator 30e having a configuration of alternating horizontal layers of metal and elastomeric material. In addition to providing damping, the elastomeric material 72e stabilizes the metal layers against buckling. The lateral stiffness of the isolator 30e is provided by the high resistance of the metal layers to tension and compression. Under vertical loads, the metal layers act like the metal plates of the other embodiments and bend to isolate vertical vibrations. The lateral ends of the metal body 70e have holes 69e for receiving the fasteners 66e, 68e to secure the isolator 30e to the bulkheads 18, 16.

Figure 22:
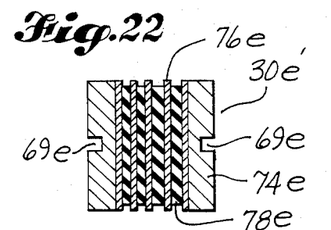
FIG. 22 is similar to FIG. 21 except that is shows a different isolator configuration that may be incorporated into the structure shown in FIG. 20.

FIG. 22 is a vertical sectional view of an alternative form of isolator 30e' that may be used in the system shown in FIGS. 19 and 20. The isolator 30e' comprises metal side portions 74e between which are positioned a plurality of laterally spaced vertical metal plates 76e. Vertical layers of elastomeric material 78e are sandwiched between the plates 76e. The metal sides 74e have holes 69e for fastening the isolator 30e' to the bulkheads 16e, 18e. In this alternative form of the isolator 30e', vertical vibrations are isolated by shearing of the elastomeric layers 78e rather than by bending of metal plates, and the desired vertical flexibility is provided by the relatively low resistance of the elastomeric material to shear. The positioning of the elastomeric material in thin layers 78e between the metal plates 76e forces the elastomeric material to act in nearly volumetric compression under side loads and roll torque. The high resistance of the elastomeric material to volumetric compression provides the desired side load and roll torque stiffness.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. In an aircraft of the type having an engine support structure, a system for mounting an engine on said structure and for isolating engine vibrations in a preferred direction, said system comprising:

an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to offer low resistance to vertical loads and allow relative vertical movement between the engine and said support structure and to isolate engine vibrations in a vertical direction; and each said means being stiff in a lateral direction and said upper isolator means being spaced vertically from said lower isolator means, to offer high resistance to lateral loads and resist relative lateral movement between the engine and said support structure and to resist engine roll torque.

2. A system as described in claim 1, in which the aircraft has a longitudinal axis; and each said isolator means comprises metal plate means extending between said support structure and said mount structure essentially parallel to said axis, and having opposite laterally extending edges secured to said support structure and said mount structure, respectively.

3. A system as described in claim 1, in which each said isolator means comprises an isolator that has opposite ends secured to said support structure and said mount structure, respectively, and that extends laterally between said ends, to resist lateral loads and engine roll torque in tension and compression.

4. A system as described in claim 3, in which each isolator includes metal plate means having horizontal metal layer portions that bend under vertical loads, and elastomeric material between said metal layer portions to damp vertical vibrations.

5. A system as described in claim 1, in which said upper isolator means is substantially vertically aligned with said lower isolator means.

6. In an aircraft of the type having an engine support structure and a longitudinal axis, a system for mounting an engine on said structure and for isolating engine vibrations in a preferred direction, said system comprising:

an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to allow relative vertical movement between the engine and said support structure and to isolate engine vibrations in a vertical direction; and each said means being stiff in a lateral direction and said upper isolation means being spaced vertically from said lower isolator means, to resist relative lateral movement between the engine and said support structure and to resist engine roll torque; in which each said isolator means comprises metal plate means extending between said support structure and said mount structure essentially parallel to said axis, and having opposite laterally extending edges secured to said support structure and said mount structure, respectively; and each said metal plate means comprises a plurality of horizontal metal plates stacked vertically.

7. A system as described in claim 6, in which each said isolator means further comprises elastomeric material positioned between said plates to damp vertical vibrations.

8. A system as described in claim 6, in which each said isolator means further comprises two pairs of laterally extending mounting members having L-shaped cross sections, for securing said metal plates to each other and to said structures.

9. A system as described in claim 8, comprising a plurality of nested generally rectangular metal tubes; said tubes having an upper portion and a lower portion that form said metal plates of said upper isolator means and said lower isolator means, respectively, and opposite side portions that are secured to said structures.

10. A system as described in claim 9, in which said side portions of said tubes and said structures have aligned holes extending longitudinally therethrough; and which further comprises a pin extending through said holes, said pin and said holes being dimensioned to provide vertical clearance for said pin within said holes to allow a predetermined amount of relative vertical movement between said structures.

11. A system as described in claim 6, in which each said structure has a plurality of longitudinally projecting mounting flanges; said metal plates of each said metal plate means have abutting opposite end portions that are received between and are secured to said flanges, and center reduced thickness portions that define gaps between said plates; and each said isolator means further comprises elastomeric material positioned in said gaps to damp vertical vibrations.

12. In an aircraft of the type having an engine support structure, a system for mounting an engine on said structure and for isolating engine vibrations in a preferred direction, said system comprising:
an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to allow relative vertical movement between the engine and said support structure and to isolate engine vibrations in a vertical direction; and each said means being stiff in a lateral direction and said upper isolator means being spaced vertically from said lower isolator means, to resist relative lateral movement between the engine and said support structure and to resist engine roll torque;
in which each said isolator means includes a pair of horizontally spaced isolators, said isolators of the upper isolator means being vertically aligned with said isolators of the lower isolator means.

13. In an aircraft of the type having an engine support structure and a longitudinal axis, a system for mounting an engine on said structure and for isolating engine vibrations in a preferred direction, said system comprising:
an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to allow relative vertical movement between the engine and said support structure and to isolate engine vibrations in a vertical direction; and each said means being stiff in a lateral direction and said upper isolator means being spaced vertically from said lower isolator means, to resist relative lateral movement between the engine and said support structure and to resist engine roll torque;
in which each said isolator means comprises metal plate means extending between said support structure and said mount structure essentially parallel to said axis, and having opposite laterally extending edges secured to said support structure and said mount structure, respectively; and each said isolator means comprises a longitudinally spaced pair of said metal plate means, said pair of metal plate means of the upper isolator means being vertically aligned with said pair of metal plate means of the lower isolator means.

14. In an aircraft of the type having an engine support structure, a system for mounting an engine on said structure and for isolating engine vibrations in a preferred direction, said system comprising:
an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to allow relative vertical movement between the engine and said support structure and to isolate engine vibrations in a vertical direction; and each said means being stiff in a lateral direction and said upper isolator means being spaced vertically from said lower isolator means, to resist relative lateral movement between the engine and said support structure and to resist engine roll torque;
in which each said isolator means comprises an isolator that has opposite ends secured to said support structure and said mount structure, respectively, and that extends laterally between said ends, to resist lateral loads and engine roll torque in tension and compression; and each said isolator comprises a plurality of laterally spaced vertical metal plates, and elastomeric material sandwiched between said plates.

15. In an aircraft of the type having an engine support structure, a system for mounting an engine on said structure and for isolating engine vibrations in a preferred direction, said system comprising:
an engine mount structure attached to the engine; and
upper isolator means and lower isolator means; each said means having a first end portion attached to said support structure, and a second end portion attached to said mount structure, to connect said support structure and said mount structure to each other; each said means being flexible in a vertical direction, to allow relative vertical movement between the engine and said support structure and to isolate engine vibrations in a vertical direction; and each said means being stiff in a lateral direction and said upper isolator means being spaced vertically from said lower isolator means, to resist relative lateral movement between the engine and said support structure and to resist engine roll torque;
in which each said isolator means comprises an isolator that has opposite ends secured to said support structure and said mount structure, respectively, and that extends laterally between said ends, to resist lateral loads and engine roll torque in tension and compression; and each said isolator means comprises a laterally spaced pair of said isolators, said pair of isolators of the upper isolator means being vertically aligned with said pair of isolators of the lower isolator means.

16. In an aircraft of the type having an engine support structure, a system for mounting an engine on said structure and for isolating engine vibrations in a preferred direction, said system comprising:
a front engine mount attaching a front portion of the engine to said structure;
a rear engine mount structure attached to a rear portion of the engine; and upper isolator means and lower isolator means; each said means having a first end portion attached to said support structure, and a second end portion attached to said mount structure, to connect said support structure and said mount structure to each other; each said means being flexible in a vertical direction, to offer low resistance to vertical loads and allow relative vertical movement between the engine and said support structure and to isolate engine vibrations in a vertical direction; and each said means being stiff in a lateral direction and said upper isolator means being spaced vertically from said lower isolator means, to offer high resistance to lateral loads and resist relative lateral movement between the engine and said support structure and engine roll torque, and to prevent lateral load reactions and roll torque reactions from redistributing to the front engine mount.

17. A system as described in claim 16, in which said upper isolator means is substantially vertically aligned with said lower isolator means.

* * * * *

UNITED STATES PATENT AND TRADEMARK OFFICE
CERTIFICATE OF CORRECTION

PATENT NO. : 4,725,019
DATED : February 16, 1988
INVENTOR(S) : John L. White

It is certified that error appears in the above-identified patent and that said Letters Patent are hereby corrected as shown below:

Column 2, line 53, "graned" should be -- granted --.

Column 5, line 30, "is", second occurrence, should be -- it --.

Claim 6, column 12, 17th line of the claim, "isolation" should be -- isolator --.

Signed and Sealed this

Twenty-ninth Day of November, 1988

Attest:

DONALD J. QUIGG

Attesting Officer

Commissioner of Patents and Trademarks